United States Patent
Choi

(10) Patent No.: US 10,917,796 B1
(45) Date of Patent: Feb. 9, 2021

(54) SPACE-BASED INTERNET NETWORK REALIZED BY SATELLITE SYSTEM

(71) Applicant: Thomas Kyo Choi, Los Angeles, CA (US)

(72) Inventor: Thomas Kyo Choi, Los Angeles, CA (US)

( * ) Notice: Subject to any disclaimer, the term of this patent is extended or adjusted under 35 U.S.C. 154(b) by 68 days.

(21) Appl. No.: 16/525,727

(22) Filed: Jul. 30, 2019

(51) Int. Cl.
  *H04W 16/18*     (2009.01)
  *H04L 29/08*     (2006.01)
  *H04W 16/28*     (2009.01)
  *H04W 84/06*     (2009.01)

(52) U.S. Cl.
  CPC ............ *H04W 16/18* (2013.01); *H04L 67/10* (2013.01); *H04W 16/28* (2013.01); *H04W 84/06* (2013.01)

(58) Field of Classification Search
  CPC ..... H04W 16/18; H04W 16/28; H04W 84/06; H04L 67/10; H04B 7/185; H04B 7/1851–18515; H04B 7/18521; H04B 7/18528; H04B 7/18576; H04B 7/18578–18597; H04B 7/19; H04B 7/195
  See application file for complete search history.

(56) References Cited

U.S. PATENT DOCUMENTS

| | | | | |
|---|---|---|---|---|
| 6,002,916 | A * | 12/1999 | Lynch ................. | H04B 7/18578 455/12.1 |
| 6,829,221 | B1 * | 12/2004 | Winckles ............ | H04B 7/18584 370/238 |
| 9,819,742 | B1 * | 11/2017 | Coleman ............. | H04L 67/1095 |
| 10,218,431 | B2 | 2/2019 | Sobhani et al. | |

(Continued)

FOREIGN PATENT DOCUMENTS

CN    110275850 A  *  6/2019  ............ G06F 13/38

OTHER PUBLICATIONS

Andrew Donoghue, "The Idea of Data Centers in Space Just Got a Little Less Crazy," Feb. 9, 2018 https://www.datacenterknowledge.com/edge-computing/idea-data-centers-space-just-got-little-less-crazy (Year: 2018).*

(Continued)

*Primary Examiner* — Maharishi V Khirodhar
*Assistant Examiner* — Kenneth P Hunt
(74) *Attorney, Agent, or Firm* — Spruson & Ferguson (Hong Kong) Limited

(57) ABSTRACT

A satellite system has satellites supporting inter-satellite communication to form a multihop communication network; computing servers distributed over the satellites and networked together to form a space-based Internet network; and Border Gateway Protocol (BGP) routers integrated to the space-based Internet network. Each satellite is installed with a BGP router to locally manage the servers installed in this satellite. Data packets generated by the servers are transmitted from the servers to the BGP router entirely over an in-satellite local area network for carrying out routing of the data packets, lessening a communication burden on inter-satellite communication. The BGP routers also assign autonomous system (AS) numbers to the servers so as to enable the space-based Internet network to function independently without a need for support from a terrestrial Internet network. It allows a user to access Internet services provided by the space-based Internet network even if the terrestrial Internet network fails.

14 Claims, 3 Drawing Sheets

(56) References Cited

U.S. PATENT DOCUMENTS

| | | | |
|---|---|---|---|
| 10,419,106 B1* | 9/2019 | Liu | H04B 7/18515 |
| 2002/0031102 A1* | 3/2002 | Wiedeman | H04L 61/1511 |
| | | | 370/316 |
| 2004/0093132 A1* | 5/2004 | Capots | H04B 7/18578 |
| | | | 701/13 |
| 2017/0195040 A1* | 7/2017 | Sobhani | H04B 10/29 |
| 2020/0175450 A1* | 6/2020 | Clancy | H04B 7/18519 |

OTHER PUBLICATIONS

L. Wood, A. Clerget, I. Andrikopoulos, G. Pavlou and W. Dabbous, "IP routing issues in satellite constellation networks," International Journal of Satellite Communications, 19(1):69-92, Jan. 2001.

Extended European Search Report of EP application No. 19206294.1 issued from the European Patent Office (EPO) dated Apr. 6, 2020.

* cited by examiner

SPACE-BASED INTERNET NETWORK REALIZED BY SATELLITE SYSTEM

LIST OF ABBREVIATIONS

AS Autonomous systems
BGP Border Gateway Protocol
IP Internet Protocol
ISP Internet service provider
IT Information technology
LAN Local area network
LEO Low earth orbit
RF Radio frequency
TCP Transmission Control Protocol
URS User radio station

FIELD OF THE INVENTION

The present invention relates to a satellite system having a plurality of satellites and a plurality of computing servers on-board for realizing a space-based Internet system.

BACKGROUND

Cloud computing is one of fastest growing segments in the global IT sector. In 2018, it reached a size of USD 200 billion at a growth rate of 20%. Cloud-based computing requires computing servers and network-attached storage devices to be installed in secure buildings. The costs on renting lands and maintaining security in data centers are high. Furthermore, these servers require electrical power to run the computation and require air conditioning to cool the servers. The amount of electrical energy required is huge, and the involved running costs are high. A cloud-based computing system also requires fiber optic cables to interconnect dispersed data centers that house different computing servers. These servers may be hundreds or thousands of kilometers apart. The maintenance and operations of the fiber optic links involve high costs.

In contrast to a terrestrial Internet network that implements cloud computing, a space-based Internet network is advantageous in that it solves a lot of technical problems encountered in the terrestrial Internet network. Costless solar power for generating electricity is abundant in Space. Unless facing the Sun, the Space is cold and has a temperature of −270° C., providing a good environment for cooling computing servers installed in Space, i.e. in satellites. Installing the computing severs in Space does not require rental of lands and is inherently secure, eliminating the land costs and lowering the costs in maintaining security of the computing servers. Furthermore, the space-based Internet network may connect to a terrestrial Internet network or may operate independently. It follows that Internet services can still be provided to users by the space-based Internet network even if the terrestrial Internet network fails.

U.S. Pat. No. 10,218,431 discloses a satellite system having plural satellites usable for realizing a space-based Internet network. The satellite system includes a geostationary satellite and LEO satellites. The LEO satellites house computing servers and storage devices. The geostationary satellite is used as a transponder to relay computation data between terrestrial stations and the LEO satellites. The computation data may also be communicated between the terrestrial stations and the LEO satellites. The LEO satellites are also communicable among themselves in order to support data communication among the computing servers resided in different satellites. One technical problem in practical realization of the satellite system is how to efficiently use inter-satellite communication links so as to avoid overloading the links. Overloading the inter-satellite communication links results in paralyzing the space-based Internet network, or at least degrading the network performance. This technical problem is not addressed in U.S. Pat. No. 10,218,431.

There is a need in the art for a satellite system configured to realize a space-based Internet network while enabling efficient inter-satellite communication.

SUMMARY OF THE INVENTION

The present invention provides a satellite system for realizing a space-based Internet network.

The system comprises a plurality of satellites, a plurality of physical servers, and a plurality of BGP routers. The plurality of satellites is configured and arranged to form a multihop communication network. An individual satellite comprises one or more inter-satellite communication modules for providing direct satellite-to-satellite bidirectional communication in forming the multihop communication network. The plurality of physical servers is distributed over the plurality of satellites. Furthermore, the plurality of physical servers is implemented with the Internet protocol suite. All individual physical servers in the plurality of physical servers are networked together to form the space-based computer network and are mutually communicable via the multihop communication network. The plurality of BGP routers is integrated to the space-based Internet network. The individual satellite is installed with a respective BGP router configured to locally manage packet routing among respective one or more physical servers installed in the individual satellite such that data packets generated by the respective one or more physical servers are transmitted from the respective one or more physical servers to the respective BGP router entirely over an in-satellite local area network for carrying out routing of the data packets. It leads to an advantage of lessening a communication burden on direct satellite-to-satellite bidirectional communication for the plurality of satellites.

Advantageously and preferably, the individual satellite further comprises a first radio transceiver for providing satellite-to-ground bidirectional communication such that a URS on Earth is communicable with the system through a visible satellite in the plurality of satellites, the visible satellite being visible to the URS. In addition, the plurality of BGP routers is further configured such that AS numbers are assignable from the plurality of BGP routers to the plurality of physical servers so as to enable the space-based Internet network to function as at least one independent AS regardless of whether the space-based Internet network is connected to a terrestrial Internet network or not. It allows a user to access Internet services provided by the space-based Internet network through the URS even when the terrestrial Internet network fails.

Preferably, the plurality of physical servers is configured to be a computing cloud.

It is also preferable that the individual satellite is positioned on a LEO.

In certain embodiments, the respective BGP router installed in the individual satellite is configured to assign AS numbers to the respective one or more physical servers resided in the individual satellite.

In certain embodiments, each individual BGP router in the plurality of BGP routers is configured to be able to assign AS numbers to the URS.

In certain embodiments, the one or more inter-satellite communication modules include a laser communication transceiver for enabling laser communication in Space.

In certain embodiments, the one or more inter-satellite communication modules include a second radio transceiver for enabling millimeter wave communication in the V band.

Preferably, the first radio transceiver includes a phased array antenna for performing adaptive beamforming in the satellite-to-ground bidirectional communication. The first radio transceiver may be configured to transmit and receive signals in the L band or S band, or both.

In certain embodiments, the individual satellite further comprises one or more third radio transceivers for further providing the satellite-to-ground bidirectional communication. The first radio transceiver and an individual third radio transceiver are configured to operate on different radio frequency bands in providing the satellite-to-ground bidirectional communication.

In certain embodiments, the individual satellite further comprises one or more laser-based optical communication modules for further providing the satellite-to-ground bidirectional communication.

In certain embodiments, at least one physical server in the plurality of physical servers is configured to communicate with one or more earth-bound redundant servers such that computing data generated by the plurality of physical servers are downloadable to the earth-bound redundant servers. It avoids data storage facilities used by the plurality of physical servers to be overloaded.

Other aspects of the present invention are disclosed as illustrated by the embodiments hereinafter.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The following definitions are used herein in the specification and the appended claims. "A cloud" or "a computing cloud" is interpreted in the sense of cloud computing or, synonymously, distributed computing over a network unless otherwise specified. "A server" is interpreted in the sense of computing. That is, a server is a computing server. A server is usually equipped with one or more processors for executing program instructions, and one or more storages for storing data. A server may be a standalone computing server (i.e. a physical server), a distributed server in the cloud, or a virtual server for handling clients' instructions. The one or more storages may be, for example, hard disks or solid-state disk drives. In case a physical server is installed on-board a satellite, the one or more processors and the one or more storages in the server are specifically configured to withstand solar and cosmic radiation, extremely high and low temperature, etc. so as to properly work in Space. "A mobile computing device" is a portable electronic device having computing power and configured to be used by a human user. For example, a mobile computing device may be a smartphone or a handheld tablet computer.

Disclosed herein is a satellite system comprising a plurality of satellites for realizing a space-based Internet network. In addition to being configured to realize the space-based Internet network, the disclosed satellite system is also advantageously configured to reduce a communication burden on inter-satellite communication. The goal of this reduction is to avoid overloading inter-satellite communication links and hence avoid a source of degrading the network performance.

Figure 1:
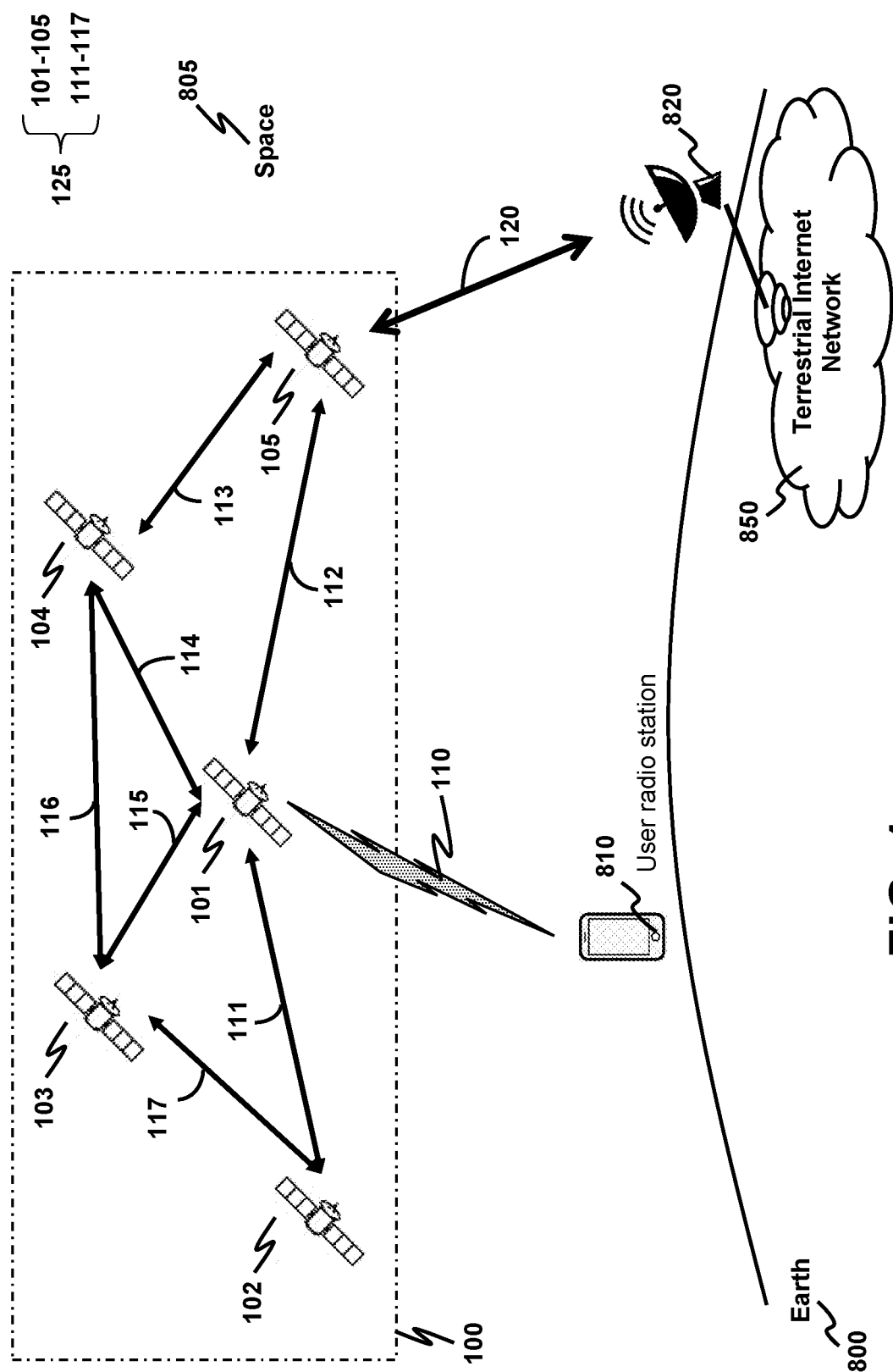
FIG. 1 depicts a satellite system in Space having a plurality of satellites for realizing a space-based Internet network in accordance with an exemplary embodiment of the present invention, where the satellites form a multihop communication network.
Figure 2:
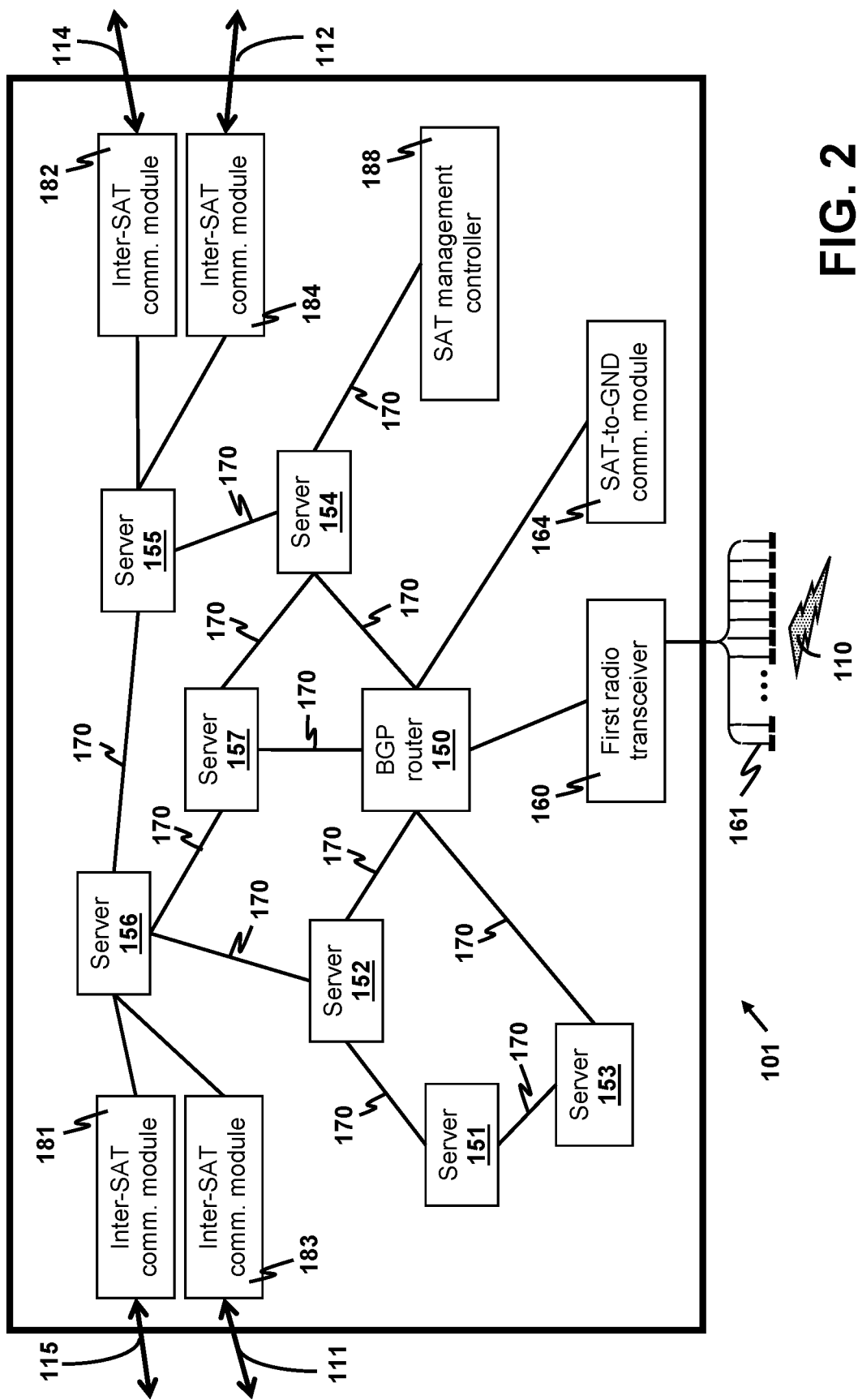
FIG. 2 depicts a schematic structure of an exemplary satellite in the satellite system.
Figure 3:
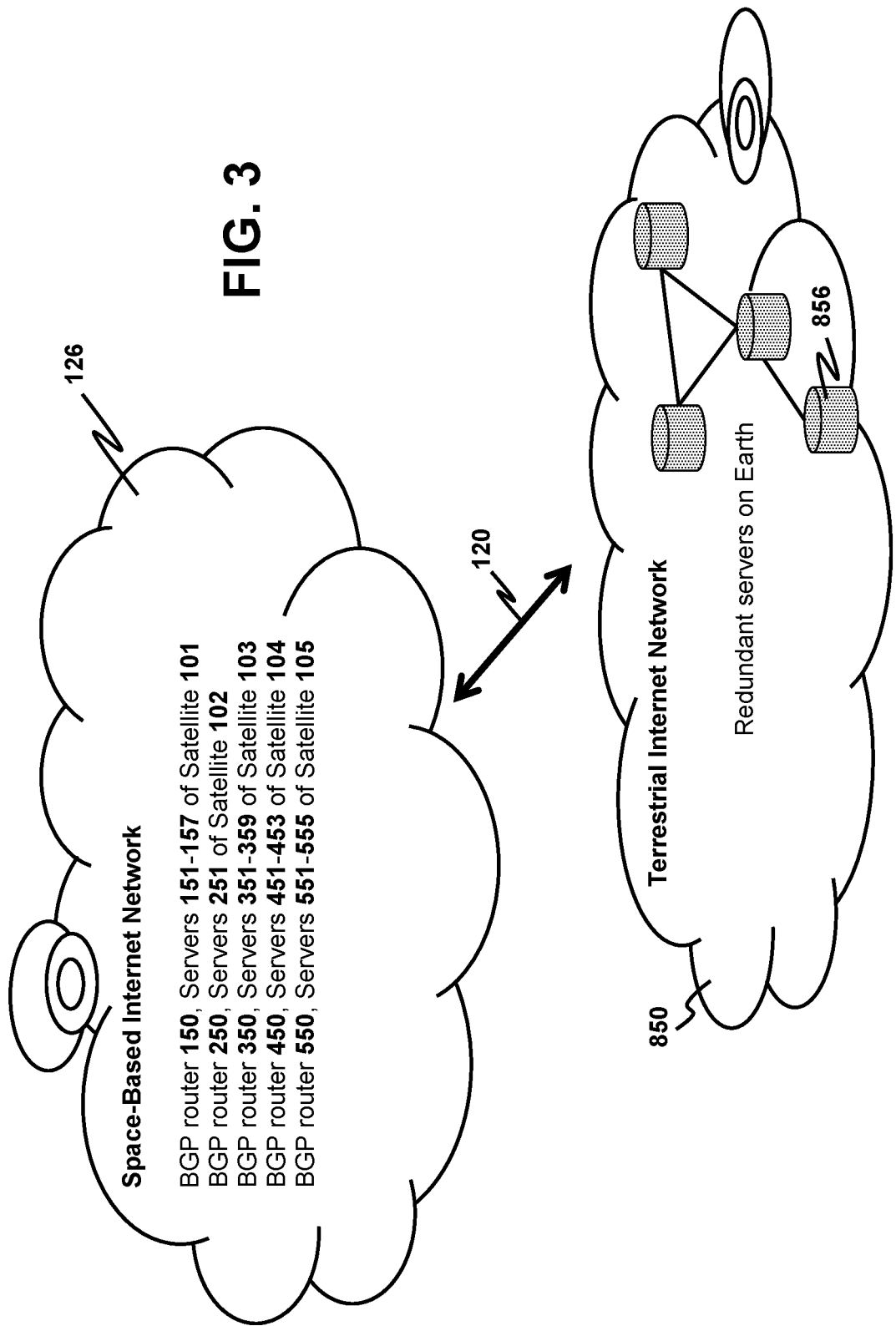
FIG. 3 illustrates the space-based Internet network formed by networking computing servers of the satellite system together and by installing the system with a plurality of BGP routers, where the space-based Internet network is connectable to a terrestrial Internet network so as to integrate into the Global Internet.

The disclosed satellite system is exemplarily illustrated hereinafter with the aid of FIGS. 1-3. FIG. 1 depicts, in accordance with an exemplary embodiment of the present invention, a satellite system 100 in Space 805 for realizing a space-based Internet network, where satellites in the satellite system 100 form a multihop communication network. FIG. 2 depicts a schematic structure of an exemplary satellite in the satellite system 100. FIG. 3 illustrates the space-based Internet network formed by networking computing servers of the satellite system 100 together, where the space-based Internet network is connectable to a terrestrial Internet network on Earth 800.

Refer to FIG. 1. The satellite system 100 comprises a plurality of satellites 101-105. Although FIG. 1 depicts that there are five satellites for illustrating the system 100, the present invention is not limited only to using five satellites in the system 100; the number of satellites in forming the disclosed satellite system in accordance with the present invention may be any number greater than or equal to two.

The plurality of satellites 101-105 is configured to support inter-satellite communication such that one satellite is bidirectionally communicable with another satellite if the two satellites in Space 805 are separated by a distance that is within a communication range of each of the two satellites. Inter-satellite communication is supported by installing each of the satellites 101-105 with one or more inter-satellite communication modules. By utilizing inter-satellite communication, the plurality of satellites 101-105 is arranged to form a multihop communication network 125. The multihop communication network 125 is formed by judiciously positioning the satellites 101-105 in such a way that in the plurality of satellites 101-105, a first satellite is communicable with a second satellite directly, or indirectly via a route including at least one intermediate satellite in between. For example, the satellite 102 directly communicates with the satellite 101 via a link 111. In another example, the satellite 102 indirectly communicates with the satellite 105 via a first route created by the links 111 and 112, where the satellite 101 is an intermediate satellite for relaying messages between the satellites 102 and 105. Note that the satellites 101, 102 and 105 are judiciously positioned such that the satellite 101 is within both communication ranges of the satellites 102 and 105, and such that the satellites 102 and 105 are also within the communication range of the satellite 101. Also in this example, the satellite 102 may also select a second route created by the links 117, 116 and 113 to indirectly communicate with the satellite 105, where the satellites 103 and 104 are two intermediate satellites in between. As shown in FIG. 1, the multihop communication network 125 is formed by including the satellites 101-105 and the links 111-117.

Advantageously, the system 100 further comprises a plurality of physical servers distributed over the plurality of satellites 101-105. All individual physical servers in the plurality of physical servers are mutually communicable via the multihop communication network 125. In addition, all the individual physical servers are implemented with the Internet protocol suite and networked together to form a space-based Internet network 126 (see FIG. 3). Refer to FIG. 2, which depicts a schematic structure of the satellite 101 as a representative satellite for exemplarily illustrating a configuration of satellites used in the system 100. For illustration, physical servers 151-157 in the satellite 101 as shown in FIG. 2 are networked together to form a part of the space-based Internet network 126. As a non-limiting example for illustration, it is considered that: the satellite 102 has a single physical server 251; the satellite 103 has physical servers 351-359; the satellite 104 has physical servers 451-453; and the satellite 105 has physical servers 551-555. Consider the satellites 104, 105 for example. Each of the physical servers 451-453 in the satellite 104 is accessible to any of the physical servers 551-555 in the satellite 105 through the link 113 of the multihop communication network 125. As such, all the physical servers 151-157, 251, 351-359, 451-453, 551-555 in the plurality of satellites 101-105 are mutually accessible, enabling these physical servers to be networked together to form the space-based Internet network 126.

It is intended that the space-based Internet network 126 is connectable to a terrestrial Internet network 850 such that the space-based Internet network 126 is integrated into the Global Internet. However, one advantageous goal of establishing the space-based Internet network 126 is to continue providing Internet services even if the terrestrial Internet network 850 fails. As such, the space-based Internet network 126 is implemented with Internet management functions, enabling ISPs installed with various web-based applications and stored with application-generated data in the space-based Internet network 126 to be able to function independently of the terrestrial Internet network 850.

To provide the Internet management functions, the system 100 is at least required to install with at least one BGP router. The presence of at least one BGP router enables the space-based Internet network 126 to route TCP/IP traffics without requiring supports from the terrestrial Internet network 850. BGP is a standardized exterior gateway protocol designed to exchange routing and reachability information among AS on the Internet. The protocol is classified as a path vector protocol. The BGP makes routing decisions based on paths, network policies, or rule-sets configured by a network administrator. The BGP is also involved in making core routing decisions. BGP may be used for routing within an AS, and is referred to as Internal BGP. In contrast, BGP used for routing across different AS'es in the Internet may be referred to as External BGP.

If plural BGP routers are installed in the system 100, routing updates received at one BGP routers are required to be propagated to the rest of the BGP routers. Usually, it generates a lot of traffics, which could put a burden on inter-satellite communication among the satellites 101-105. In the art, it is suggested that these traffics are best handled through dedicated terrestrial links to avoid large amounts of routing table state update traffics through inter-satellite links. See, for example, L. WOOD, A. CLERGET, I. ANDRIKOPOULOS, G. PAVLOU and W. DABBOUS, "IP routing issues in satellite constellation networks," *International Journal of Satellite Communications*, 19(1):69-92, January 2001, the disclosure of which is incorporated by reference herein. However, the independence of the space-based Internet network 126 over the terrestrial Internet network 850 implies that in daily operations the system 100 is operated without support from any terrestrial Internet network. In view of this operation condition and the aforementioned suggestion in the art, it would be indicative to use only BGP router in the system 100.

However, if there is only one BGP router, data packets generated by a physical server in one satellite are required to be sent to the BGP router such that the BGP router carries out routing of the data packets and relays the data packets to their destinations. As a result, it is easy to cause overloading on inter-satellite communication links of the satellite that houses the BGP router. Even if a few of BGP routers are distributed over the plurality of satellites 101-105, the need for sending data packets from one satellite to another for requesting a certain BGP router to carry out routing is still present. Therefore, it is preferable to install a BGP router in each of the satellites 101-105. Physical server(s) in a satellite can directly and conveniently communicate with the BGP router on the same satellite through the in-satellite LAN without involving any inter-satellite link. Even if inter-satellite communication may be invoked after the BGP router determines the routes of the data packets to be traveled and relays the data packets to their destinations, the elimination of inter-satellite communication during the stage of sending the data packets to the BGP router still reduces a burden on inter-satellite communication. Since the multihop communication network 125 is used for spreading the routing updates to all the BGP routers in the system 100, the amount of data traffics generated for a first situation that each satellite is equipped with one BGP router is similar to that generated for a second situation that only a small number of BGP routers are installed in the system 100.

Based on the observation made above, it leads to an advantageous configuration of the disclosed system 100 that the system 100 further comprises a plurality of BGP routers integrated to the space-based Internet network 126, where the individual satellite is installed with a respective BGP router configured to locally manage packet routing among respective one or more physical servers installed in the individual satellite. As a result, data packets generated by the respective one or more physical servers are transmitted from the respective one or more physical servers to the respective BGP router entirely over an in-satellite LAN. The respective BGP router then carries out routing of the data packets to their destinations. Thereby, a communication burden on direct satellite-to-satellite bidirectional communication for the plurality of satellites is lessened. FIG. 2 depicts, as an illustrative example, an in-satellite LAN 170 installed in the satellite 101.

A further advantage of installing the system 100 with the plurality of BGP routers is that the BGP routers contain all the Internet routing data such that these BGP routers use TCP/IP protocols and IP addresses to reroute Internet computing commands to relevant servers in the plurality of physical servers 151-157, 251, 351-359, 451-453, 551-555. All the physical servers 151-157, 251, 351-359, 451-453, 551-555 with their network-attached storages are capable of addressing each other using the TCP/IP protocol through public and private IP addresses, depending on requirements of users or customers.

For illustration, FIG. 2 shows that the satellite 101 includes a BGP router 150. In particular, the BGP router 150 is networked with the physical servers 151-157 in the satellite 101 so that the BGP router 150 is integrated into the space-based Internet network 126. The BGP router 150 is used to locally manage packet routing for the physical servers 151-157. Each of the physical servers 151-157 communicates with the BGP router 150 over the in-satellite LAN 170. FIG. 3 shows an illustrative example that the satellites 102, 103, 104, 105 are installed with respective BGP routers 250, 350, 450, 550, respectively.

Advantageously, the plurality of BGP routers 150, 250, 350, 450, 550 is further configured such that AS numbers are assignable from the plurality of BGP routers to the plurality of physical servers. It enables the space-based Internet network 126 to function as one or more independent AS'es regardless of whether the space-based Internet network 126 is connected to a terrestrial Internet network or not. By forming the one or more independent AS'es, the space-based Internet network 126 allows a user to directly access the Internet services even when the terrestrial Internet network 850 fails.

In one implementation option, the respective BGP router installed in the individual satellite is configured to assign AS numbers to the respective one or more physical servers resided in the individual satellite. Respective one or more physical servers in the individual satellite collectively form an AS. In the system 100, the plurality of satellites 101-105 gives rise to five independent AS'es.

In another implementation option, only one BGP router selected from the plurality of BGP routers 150, 250, 350, 450, 550 is allowed to assign AS numbers in a centralized way. As a result, the space-based Internet network 126 forms one single AS.

In yet another implementation option, each of the BGP routers 150, 250, 350, 450, 550 is allowed to assign AS numbers to any third party (including any physical server). All the physical servers 151-157, 251, 351-359, 451-453, 551-555 are reconfigurably organized into different AS'es. It is useful when there are a number of users/customers. Each user/customer is served by an independent AS for matching his/her needs in computation requirements and/or for implementing customized security policies in the AS to protect the user/customer's data.

Since the Internet services are provided to the user on Earth 800 even if the terrestrial Internet network 850 fails, the system 100 is required to provide a means for communicating with the user. Therefore, each of the satellites 101-105 further comprises a first radio transceiver for providing satellite-to-ground bidirectional communication. The user is then able to access the Internet services provided by the space-based Internet network 126 by equipping with a URS 810 configured to wirelessly communicate with the first radio transceiver of any satellite in the system 100. The URS 810 is communicable, directly and wirelessly, with the system 100 through a visible satellite in the plurality of satellites. The visible satellite is visible to the URS 810. That is, the visible satellite has a line-of-sight path with the URS 810.

As an example shown in FIG. 1, the satellite 101 is a visible satellite to the URS 810 so that the satellite 101 communicates with the URS 810 through a line-of-sight wireless channel 110. It is advantageous if the BGP router 150 is able to assign AS numbers. The BGP router 150 can immediately assign an AS number and also allocate an IP address to the URS 810 so as to allow the URS 810 to immediately access the Internet services provided by the space-based Internet network 126 in the event that the terrestrial Internet network 850 fails. Hence, it is advantageous that each individual BGP router in the plurality of BGP routers 150, 250, 350, 450, 550 of the system 100 is configured to be able to assign AS numbers to other parties.

The URS 810 may be a mobile computing device, offering mobility to the user and allowing the user to directly access the space-based Internet network 126 whenever a need arises. Note that the mobile computing device is implemented with appropriate electronic circuits and RF components, such as RF transceivers and antennas, and programmed with appropriate communication protocols for initiating and communicating with the system 100.

Other implementation details of the system 100 are elaborated as follows.

It is advantageous if the plurality of physical servers 151-157, 251, 351-359, 451-453, 551-555 is configured to be a computing cloud such that computation resources in these physical servers may be shared in an optimal way according to tasks to be performed.

Refer to FIG. 2. In the satellite 101, a first radio transceiver 160 is used for providing the satellite-to-ground bidirectional communication so as to communicate with the URS 810. In general, the URS 810, which may be a hand-held mobile computing device, is power-limited. To increase the signal-to-noise ratio in signal transmission or reception, preferably the first radio transceiver 160 is configured to provide adaptive beamforming. It is preferable that the first radio transceiver 160 includes a phased array antenna 161 for performing adaptive beamforming in the satellite-to-ground bidirectional communication. In one implementation option, the first radio transceiver 160 is configured to transmit and receive signals in the L band or S band, or both. The L band covers a range of frequencies in the radio spectrum from 1 GHz to 2 GHz. For the S band, it has a frequency range of 2 GHz to 4 GHz. Transmitting signals at carrier frequencies in the L band or the S band has a number of practical advantages in the satellite-to-ground bidirectional communication, such as achieving a low attenuation when the uplink and downlink signals of the link 110 propagate in the troposphere, and enabling a low-cost implementation of the first radio transceiver 160.

As mentioned above, inter-satellite communication is supported by installing each of the satellites 101-105 with one or more inter-satellite communication modules. For elaborating the one or more inter-satellite communication modules installed in each satellite, consider the satellite 101 depicted in FIG. 2. In the satellite 101, inter-satellite communication modules 181-184 are used for supporting the inter-satellite communication links 115, 114, 111, 112, respectively. Usually, high-speed inter-satellite communication is required. To achieve high-speed data transmission, preferably the inter-satellite communication modules 181-184 include a laser communication transceiver for enabling laser communication in Space 805. More preferably, each of the inter-satellite communication modules 181-184 is a laser communication transceiver. Alternative to laser communication, high-speed data transmission is achievable by using millimeter wave communication. The inter-satellite communication modules 181-184 may include a second radio transceiver for enabling millimeter wave communication in the V band. The V band is a band of frequencies in the microwave portion of the electromagnetic spectrum ranging from 40 to 75 GHz.

As mentioned above, each of the satellites 101-105 is installed with the first radio transceiver to provide satellite-to-ground bidirectional communication. In this way, the URS 810 is enabled to communicate with the space-based Internet network 126 through communicating with a visible satellite selected from the plurality of satellites 101-105. Advantageously but optionally, the satellites 101-105 are arranged to travel on orbits selected such that the URS 810 is visible to at least one of the satellites 101-105 any time. It follows that anytime when a need for Internet services arises, the user is able to connect to the space-based Internet network 126.

Preferably, each of the satellites 101-105 is positioned in a LEO, which is generally considered to be an orbit having an altitude of less than 2000 km above the Earth 800.

Optionally, the system 100 may be extended to include a sufficient number of satellites to achieve global coverage. Global coverage may be established in a perspective that the URS 810 is always able to "see" at least one visible satellite present for communicating with the system 100 such that the user is communicable with the system 100 anytime anywhere.

In practice, an individual satellite in the system 100 is installed with a satellite management controller for controlling all resources in this satellite. As illustrated in FIG. 2, a satellite management controller 188 is installed in the satellite 101. The satellite management controller 188 is usually realized as a computing server, and is therefore usually networked with the physical servers 151-157. As such, the satellite management controller 188 is usually joined to the space-based Internet network 126.

The system 100 as disclosed above is self-sufficient in setting up the space-based Internet network 126 to provide Internet services without involving a terrestrial non-user facility such as the terrestrial Internet network 850. The system 100 is securely located in Space 805 such that, as one practical advantage, the space-based Internet network 126 is still operating even in case of disasters happened on Earth 800. For example, terrestrial communication networks on which the user relies to connect to the Internet fail due to power failure, earthquake, or fire. The ability to access the Internet services by using the system 100 is particularly valuable in case of disasters.

As mentioned above, it is not intended that the system 100 is completely isolated from the Earth 800. In certain embodiments, the system 100 is supported by one or more earth-bound redundant servers 856 such that computing data generated by the plurality of physical servers 151-157, 251, 351-359, 451-453, 551-555 are downloadable to the one or more earth-bound redundant servers 856. It advantageously avoids data storage facilities used by the plurality of physical servers 151-157, 251, 351-359, 451-453, 551-555 to be overloaded. In practical realization, at least one physical server in the plurality of physical servers 151-157, 251, 351-359, 451-453, 551-555 is configured to communicate with the one or more earth-bound redundant servers 856 to facilitate the download of the computing data.

The one or more earth-bound redundant servers 856 communicate with the system 100 through a bidirectional communication link 120, which connects, for instance, the satellite 105 and an Earth station 820 when the satellite 105 is visible to the Earth station 820. The Earth station 820 may in turn connect to the one or more earth-bound redundant servers 856 through the terrestrial Internet network 850.

By using the bidirectional communication link 120, the space-based Internet network 126 is integrated with the Global Internet by joining to the terrestrial Internet network 850 on Earth 800, as shown in FIG. 3.

To establish the bidirectional communication link 120, one or more of the satellites 101-105 are each installed with one or more satellite-to-ground communication modules for communicating between the Earth station 820 and a certain satellite visible to the Earth station 820. For exemplarily illustrating the one or more satellite-to-ground communication modules, refer to FIG. 2. The satellite 101 is installed with a satellite-to-ground communication module 164 for communicating with the Earth station 820. In certain situations, it is desirable to have a high-speed link between the Earth station 820 and the system 100. To achieve high-speed communication, a laser-based optical communication module may be used for realizing the satellite-to-ground communication module 164. It is also possible to use radio communication in achieving the high-speed link. The satellite-to-ground communication module 164 is then realized as a radio transceiver. Usually, the first radio transceiver 160 and the satellite-to-ground communication module 164 are configured to operate on different radio frequency bands.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A satellite system for realizing a space-based Internet network, the system comprising:
a plurality of satellites configured and arranged to form a multihop communication network, an individual satellite comprising one or more inter-satellite communication modules for providing direct satellite-to-satellite bidirectional communication in forming the multihop communication network;
a plurality of physical servers distributed over the plurality of satellites, the plurality of physical servers being implemented with the Internet protocol suite, all individual physical servers in the plurality of physical servers being networked together to form the space-based computer network and being mutually communicable via the multihop communication network; and
a plurality of Border Gateway Protocol (BGP) routers integrated to the space-based Internet network, wherein the individual satellite is installed with a respective BGP router configured to locally manage packet routing among respective one or more physical servers installed in the individual satellite such that data packets generated by the respective one or more physical servers are transmitted from the respective one or more physical servers to the respective BGP router entirely over an in-satellite local area network for carrying out routing of the data packets, thereby lessening a communication burden on direct satellite-to-satellite bidirectional communication for the plurality of satellites.

2. The system of claim 1, wherein:
the individual satellite further comprises a first radio transceiver for providing satellite-to-ground bidirectional communication such that a user radio station (URS) on Earth is communicable with the system through a visible satellite in the plurality of satellites, the visible satellite being visible to the URS; and the plurality of BGP routers is further configured such that autonomous system (AS) numbers are assignable from the plurality of BGP routers to the plurality of physical servers so as to enable the space-based Internet network to function as at least one independent AS regardless of whether the space-based Internet network is connected to a terrestrial Internet network or not, allowing a user to access Internet services provided by the space-based Internet network through the URS even when the terrestrial Internet network fails.

3. The system of claim 2, wherein the respective BGP router installed in the individual satellite is configured to assign AS numbers to the respective one or more physical servers resided in the individual satellite.

4. The system of claim 2, wherein each individual BGP router in the plurality of BGP routers is configured to be able to assign AS numbers to the URS.

5. The system of claim 1, wherein the plurality of physical servers is configured to be a computing cloud.

6. The system of claim 1, wherein the individual satellite is positioned on a low earth orbit (LEO).

7. The system of claim 1, wherein the one or more inter-satellite communication modules include a laser communication transceiver for enabling laser communication in Space.

8. The system of claim 1, wherein the one or more inter-satellite communication modules include a second radio transceiver for enabling millimeter wave communication in the V band.

9. The system of claim 2, wherein the first radio transceiver includes a phased array antenna for performing adaptive beamforming in the satellite-to-ground bidirectional communication.

10. The system of claim 2, wherein the first radio transceiver is configured to transmit and receive signals in the L band or S band, or both.

11. The system of claim 1, wherein the individual satellite further comprises one or more third radio transceivers for further providing the satellite-to-ground bidirectional communication, the first radio transceiver and an individual third radio transceiver being configured to operate on different radio frequency bands in providing the satellite-to-ground bidirectional communication.

12. The system of claim 11, wherein at least one physical server in the plurality of physical servers is configured to communicate with one or more earth-bound redundant servers such that computing data generated by the plurality of physical servers are downloadable to the earth-bound redundant servers, avoiding data storage facilities used by the plurality of physical servers to be overloaded.

13. The system of claim 1, wherein the individual satellite further comprises one or more laser-based optical communication modules for further providing the satellite-to-ground bidirectional communication.

14. The system of claim 13, wherein at least one physical server in the plurality of physical servers is configured to communicate with one or more earth-bound redundant servers such that computing data generated by the plurality of physical servers are downloadable to the earth-bound redundant servers, avoiding data storage facilities used by the plurality of physical servers to be overloaded.

* * * * *